US009728824B2

(12) United States Patent
Baumgartner et al.

(10) Patent No.: US 9,728,824 B2
(45) Date of Patent: Aug. 8, 2017

(54) RECHARGEABLE BATTERY (71) Applicant: Robert Bosch GmbH, Stuttgart (DE)

(72) Inventors: Josef Baumgartner, Stuttgart (DE); Wolf Zahn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/485,162

(22) Filed: Sep. 12, 2014

(65) Prior Publication Data
US 2015/0079444 A1 Mar. 19, 2015

(30) Foreign Application Priority Data
Sep. 16, 2013 (DE) ........................ 10 2013 218 527

(51) Int. Cl.
| | |
|---|---|
| *H01M 10/50* | (2006.01) |
| *H01M 10/6551* | (2014.01) |
| *H01M 2/10* | (2006.01) |
| *H01M 10/6235* | (2014.01) |
| *H01M 10/613* | (2014.01) |
| *H01M 10/6555* | (2014.01) |
| *H01M 10/643* | (2014.01) |
| *H01M 2/20* | (2006.01) |
| *H01M 2/30* | (2006.01) |

(52) U.S. Cl.
CPC ..... *H01M 10/5046* (2013.01); *H01M 2/1022* (2013.01); *H01M 2/1094* (2013.01); *H01M 10/613* (2015.04); *H01M 10/6235* (2015.04); *H01M 10/643* (2015.04); *H01M 10/6551* (2015.04); *H01M 10/6555* (2015.04); *H01M 2/105* (2013.01); *H01M 2/20* (2013.01); *H01M 2/30* (2013.01); *H01M 2220/30* (2013.01)

(58) Field of Classification Search
CPC .. H01M 2/1094; H01M 2/1022; H01M 2/105; H01M 2/20; H01M 2/30; H01M 10/5046; H01M 10/6551; H01M 10/6235; H01M 10/613; H01M 10/6555; H01M 10/643; H01M 2220/30
See application file for complete search history.

(56) References Cited

U.S. PATENT DOCUMENTS

| 6,692,864 B1 | 2/2004 | Dansui et al. |
| 6,783,886 B1 | 8/2004 | Sakakibara et al. |
| 2011/0165454 A1* | 7/2011 | Iwamoto ............. H01M 2/1094 429/163 |

FOREIGN PATENT DOCUMENTS

| EP | 0869571 | 10/1998 |
| EP | 0940864 | 9/1999 |
| EP | 0994523 | 4/2000 |
| EP | 1274137 | 1/2003 |

(Continued)

*Primary Examiner* — Jane Rhee
(74) *Attorney, Agent, or Firm* — Norton Rose Fulbright US LLP; Gerard Messina (57) ABSTRACT

A rechargeable battery, particularly a rechargeable tool battery, includes at least one cell block which has at least one heat dissipation element, which is provided to dissipate heat from the cell block, and a rechargeable battery housing, which has at least one heat radiation element, which is provided at least to radiate the heat dissipated by the heat dissipation element to the surroundings. It is provided that the heat dissipation element and the heat radiation element are formed as components configured separately from each other.

40 Claims, 9 Drawing Sheets

(56) References Cited

FOREIGN PATENT DOCUMENTS

| EP | 1309019 | 5/2003 |
|---|---|---|
| WO | WO 2014/079507 | 5/2014 |

\* cited by examiner

RECHARGEABLE BATTERY

RELATED APPLICATION INFORMATION

The present application claims priority to and the benefit of German patent application no. 10 2013 218 527.8, which was filed in Germany on Sep. 16, 2013, the disclosure of which is incorporated herein by reference.

FIELD OF THE INVENTION

The present invention relates to a rechargeable battery.

BACKGROUND INFORMATION

A rechargeable battery has been provided before, particularly a rechargeable tool battery, having at least one cell block which has at least one heat dissipation element which is provided to dissipate heat from the cell block, and having a rechargeable battery housing which has at least one heat radiation element, which is provided at least to radiate the heat dissipated by the heat dissipation element to the surroundings.

SUMMARY OF THE INVENTION

The present invention relates to a rechargeable battery, particularly a rechargeable tool battery, having at least one cell block which has at least one heat dissipation element, which is provided to dissipate heat from the cell block, and having a rechargeable battery housing which has at least one heat radiation element, which is provided at least to radiate the heat dissipated by the heat dissipation element to the surroundings.

It is provided that the heat dissipation element and the heat radiation element be formed as components configured separately from each other. By "rechargeable tool battery" one should particularly understand a rechargeable battery provided to supply a tool with electric power. A "tool" should be understood in particular as a tool that appears practical to one skilled in the art, but advantageously a drilling machine, a hammer drill, a percussion riveter, a saw, a plane, a screwdriver, a milling tool, a grinder, an angle grinder, a building site measuring device, a multifunctional tool and/or advantageously a gardening device, particularly a lawn mower.

Alternatively or in addition, the rechargeable battery could be provided to provide a bicycle, which is at least partially driven electrically, with electric power. In order to supply a piece of equipment, the rechargeable battery, in particular, should be able to be connected by an operator to the equipment or separated from the equipment in a non-destructive manner and especially without tools. By a "cell block" one may particularly understand a unit having a plurality of rechargeable battery cells which are provided to supply electric power particularly to a tool. The cell block may include at least two rechargeable battery cells, advantageously at least eight rechargeable battery cells, especially advantageously at least 16 rechargeable battery cells. The rechargeable battery cells are advantageously arranged in a stationary mount with respect to one another. In a particularly advantageous manner, the heat dissipation element arranges the rechargeable battery cells relatively to one another. The cell block particularly has a cell block housing which is provided to fasten the heat dissipation element and advantageously to this the rechargeable battery cells to one another.

In particular, the cell block forms a subassembly, at least during an assembly step. The cell block may be provided to make available electric power having a voltage of greater than 12 Volt, especially advantageously of greater than 20 Volt. The cell block is particularly provided to make available electric power having a voltage of less than 50 Volt. The cell block and with that, the rechargeable battery has a storage capacity of less than 2000 watt-hours, advantageously less than 750 watt-hours, especially advantageously less than 250 watt-hours. The cell block and with that, the rechargeable battery particularly has a storage capacity of more than 2 watt-hours, advantageously more than 25 watt-hours, especially advantageously more than 100 watt-hours. By "heat dissipation element" one should particularly understand an element which has a thermal conductivity greater than 5 W/(mK), advantageously greater than 25 W/(mK), particularly advantageously greater than 100 W/(mK). The heat conducting element is particularly configured as a metal part, advantageously as an aluminum part, especially advantageously as an aluminum profile.

Alternatively, the heat conducting element could be made of another material that would appear useful to one skilled in the art, such as carbon, and/or heat conducting means appearing useful to one skilled in the art, such as a heat pipe and/or carbon nanotubes. The heat dissipation element may be provided to position the rechargeable battery cells. The heat dissipation element is particularly provided to protect the rechargeable battery cells from mechanical effects. The heat dissipation element is advantageously provided to cool rechargeable battery cells that lie inside as compared to other rechargeable battery cells. The heat conducting element may have an extension along a straight line which amounts to at least 25%, advantageously at least 50%, particularly advantageously 75% of the extension of the cell blocks along the straight line.

"Provided" in particular means specially programmed, configured and/or equipped. By an object being provided for a certain function, one should understand, in particular, that the object fulfills and/or carries out this certain function in at least one application state and/or operating state. By "heat" one should particularly understand a heat loss created during charging and discharging of the cell block in the rechargeable battery cells. By the term "dissipate" it should particularly be understood in this context that the heat dissipation element cools the rechargeable battery cells in at least one operating state. In particular, the heat dissipation element or perhaps the heat dissipation elements of the cell block dissipate(s) a substantial proportion of the heat created and dissipated in the rechargeable battery cells, that is particularly, in at least one operating state more than 30% of the total dissipated heat, advantageously more than 50% of the total dissipated heat, especially advantageously more than 75% of the total dissipated heat.

By a "rechargeable battery housing" one should particularly understand a unit that is provided to protect at least the cell block from mechanical effects from the outside. The rechargeable battery housing may enclose the cell block, at least essentially completely, which means, in particular, the rechargeable battery housing encloses a center of the cell block in two planes that are perpendicular to each other, by more than 270 degrees. The heat radiation element especially forms at least a part of the rechargeable battery housing. By a "heat radiation element" one should particularly understand an element which is provided to give off the heat dissipated from the cell block to the surroundings, namely, at least to radiate it. In addition, the heat radiation element advantageously gives off a part of the dissipated heat by conduction, and particularly by convection, to the surrounding air.

The heat radiation element may form at least one outer surface of the rechargeable battery. The heat radiation element particularly has cooling ribs on the outer surface, a black coloration and/or a coating provided for optimizing heat radiation. The rechargeable battery housing may have a plurality of heat radiation elements which are situated particularly at different outer sides of the rechargeable battery. Alternatively, the rechargeable battery housing could have exactly one heat radiation element, which is in particular situated on several sides and advantageously on exactly one side of the rechargeable battery. Moreover, the rechargeable battery housing could have at least three, advantageously at least four or particularly advantageously at least five heat radiation elements, which are particularly situated on different outer sides of the rechargeable battery.

One should particularly understand by the expression "formed as components configured separately from one another" to mean that the heat dissipation element and the heat radiation element are configured in at least one assembly step as two different components. After assembly, the heat dissipation element and the heat radiation element are advantageously connected to each other in a continuous material, in a form-locking and/or a force-locking manner. After assembly, particularly advantageously, the heat dissipation element and the heat radiation element are connected to each other in a form-locking and a force-locking manner. Because of the embodiment according to the present invention of the rechargeable battery, an advantageous protection of the cell block, especially from dust and/or moisture, may be enabled in a constructively simple manner.

In a further embodiment it is provided that the rechargeable battery have a sealing device, which is provided to close the cell block at least to dust and/or water, whereby the rechargeable battery is advantageously able to be used in outdoor work during bad weather. By a "sealing device" one should particularly understand a device that appears useful to one skilled in the art, which is suitable for preventing the penetration of dust and/or moisture into the cell block. The sealing device particularly prevents the penetration of dust and/or moisture into a particularly essentially total region between the rechargeable battery cells of the cell block. By a "sealing device" one should particularly not understand a device which seals or insulates a single rechargeable battery cell. By the expression "at least sealed from dust and/or water" one should understand that the sealing foil prevents the penetration of water and/or dust into the cell block, in at least one operating state. The sealing foil may protect the cell block according to Standard IEC 60529, at least using protective class IP55, which may be IP67, especially IP68. Electrical contacts of the rechargeable battery, in particular, energy contacts and communication contacts of the rechargeable battery, may be situated in a region which is outside of a region protected by the sealing device. By "closing" one should particularly understand that the sealing foil is situated in a region through which water and/or dust could penetrate into the cell block, if there were no sealing foil.

Moreover, it is provided that the sealing device have a sealing foil enclosing the cell block, whereby, in a constructively simple manner, an especially advantageous protection from dust and/or moisture is able to be achieved. By the term "enclosing" it should particularly be understood in this connection that the sealing foil surrounds a center of the cell block in at least one plane by more than 180 degrees, advantageously by more than 270 degrees, especially advantageously by 360 degrees. By "sealing foil" one should particularly understand a foil that is provided to close a region generated by the cell block in a manner free from dust and/or water. The sealing foil is particularly thinner than 1000 µm, which may be thinner than 500 µm and/or especially thinner than 200 µm. At points of impact and/or transitions between two regions of the sealing foil, the sealing foil may be sealed in one continuous material. In particular, the sealing foil is configured as a blocking foil. The sealing foil is advantageously configured as a self-shrinking foil particularly caused by heating action. Alternatively or in addition to the sealing foil, the cell block housing could be closed water-tight and/or dust-tight by the sealing device. The sealing foil may be configured to be hose-shaped. Alternatively, the sealing foil could be configured to be sack-shaped.

Furthermore, it is provided that the sealing device be situated at least partially between the heat dissipation element and the heat radiation element, whereby, in a constructively simple manner, sealing is enabled at the components dissipating the heat from the cell block. By the term "between" one should particularly understand that the sealing device, advantageously the sealing foil of the sealing device, lies on a straight line which, starting from the sealing device, on one side intersects the heat dissipation element and on the other side the heat radiation element. Alternatively or in addition to the sealing foil, a thin-walled region of the cell block housing could be situated in a planar manner between the heat dissipation element and the heat radiation element. The sealing device may be situated, at least partially, directly between the heat dissipation element and the heat radiation element, which means that the heat dissipation element lies against a first side of a region of the sealing device, and the heat radiation element against a second side of the region of the sealing device, opposite the first side. In particular, the heat dissipation element and the heat radiation element are completely separated from each other by the sealing device, which means particularly that heat dissipation element and the heat radiation element do not lie adjacent to each other. The sealing foil could alternatively have an opening, between the heat dissipation element and the heat radiation element, which is sealed by the heat dissipation element and the heat radiation element and particularly by a sealing arrangement. By "sealing arrangement" one should understand sealing arrangement that is useful to one skilled in the art, but may be specifically be a sealing arrangement made of a thermoplastic elastomer, made of rubber or made of an adhesive gluing component. The sealing arrangement is advantageously an O-ring-shaped and/or is advantageously in the form of a band.

It is additionally provided that the sealing device be provided to conduct an at least substantial proportion of the heat from the heat dissipation element to the heat radiation element, whereby one may do without a direct mechanical contact between the heat dissipation element and the heat radiation element. By a "substantial proportion of the heat" one should understand, in at least one operating state, more than 25%, advantageously more than 50%, particularly advantageously more than 75% of the total dissipated heat.

It is further provided that the rechargeable battery have a coupling device which is provided to press the heat dissipation element and the heat radiation element against each other, whereby an advantageously low thermal resistance is able to be achieved between the heat dissipation element and the heat radiation element. By a "coupling device" one should particularly understand a device which fastens the heat dissipation element and the heat radiation element mechanically to each other. By the term "press against each other" one should particularly understand that the coupling device brings about a force on the heat dissipation element and/or the heat radiation element which is directed towards the other element, respectively.

In one advantageous development of the present invention, it is provided that the coupling device effect a compression force on the sealing device, especially the sealing foil of the sealing device, whereby a particularly slight thermal resistance between the heat dissipation element and the heat radiation element is able to be achieved, and a constructively simple protection from dust and/or moisture. By the expression "effect a compression force" one should understand in this connection that the coupling device presses the heat dissipation element from a first side and the heat radiation element from a second side, facing away from the first side, against the sealing device, particularly against at least one part of the sealing device, advantageously the sealing foil.

Moreover, it is provided that the sealing device have at least one recess, by which the coupling device has its effect, whereby stable fastening is constructively simply enabled. By a "recess" one should particularly understand a region bordered by the sealing foil, through which the coupling device connects the heat dissipation element to the heat radiation element. The recess may have an area parallel to a surface of the sealing foil that is smaller than 5 cm2, advantageously smaller than 1 cm2. The recess may be formed by a hole and/or a slit in the sealing foil of the sealing device.

Moreover, it is provided that the coupling device have at least one screw, which presses the heat dissipation element and the heat radiation element against each other, whereby a stable fastening is enabled in a constructively simple manner.

In addition, it is provided that the coupling device have at least one snap-in arrangement which presses the heat dissipation element and the heat radiation element against each other, whereby a screwing process and/or a recess in the sealing device may be omitted. By "snap-in arrangement" one should understand, in this connection, particularly an arrangement for producing a mechanical connection, the snap-in arrangement engaging in an undercut of an arrangement corresponding to the snap-in arrangement. The snap-in arrangement may be elastically deflected to engage in the undercut.

Alternatively, the snap-in arrangement could be held in the undercut by another coupling arrangement that appears useful to one skilled in the art, such as a screw. The snap-in arrangement may be particularly provided to fasten the heat dissipation element and the heat radiation element to each other by an at least form-locking connection.

Furthermore, it is provided that the cell block have at last one rechargeable battery cell and at least one fastening arrangement, which fastens the at least one rechargeable battery cell at least in the heat dissipation element, whereby the rechargeable battery cells are able to be advantageously fastened, protected from mechanical and electrical effects in the, in particular, metallic heat dissipation element, and tolerances of the heat dissipation element are advantageously able to be compensated for. Advantageously, at least the fastening arrangement fasten the at least one rechargeable battery cell between two heat dissipation elements and/or particularly between an heat dissipation element and the cell block housing. A "rechargeable battery cell" should particularly be understood to mean a unit provided to convert chemically stored energy into electric power. The rechargeable battery cell may have an anode, a cathode, an electrolyte and a cell housing. By "fastening arrangement" one should understand in this connection an arrangement provided to effect a fastening force directly on the at least one rechargeable battery cell. The fastening arrangement is particularly situated directly between the at least one rechargeable battery cell and the heat dissipation element. The fastening arrangement may be provided to compensate the tolerances of the heat dissipation element. In particular, the fastening arrangement may be provided to fasten the rechargeable battery cell in the heat dissipation element in an electrically insulated manner. The fastening arrangement may have a rubber-elastic material. The fastening arrangement may have a thickness, between the rechargeable battery cell and the heat dissipation element, especially on a perpendicular of a surface of the rechargeable battery cell, in at least one region, of between 0.1 and 5 mm, advantageously between 0.2 and 2 mm, especially advantageously between 0.5 and 1 mm. In particular, the fastening arrangement may be provided to fasten a plurality of rechargeable battery cells in the heat dissipation element. In particular, the at least one fastening arrangement may be provided to fasten a plurality of rechargeable battery cells between two heat dissipation elements.

The rechargeable battery according to the present invention, in this connection, should not be restricted to the application and specific embodiment described above. In order to fulfill a method of functioning described herein, the rechargeable battery according to the present invention may in particular have a number of individual elements, components and units that deviates from a number mentioned herein.

Further advantages are derived from the subsequent description of the drawings. The drawings show five exemplary embodiments of the present invention. The drawings, the description and the claims include numerous features in combination. One skilled in the art will also expediently consider the features individually, and will combine them into useful further combinations.

DETAILED DESCRIPTION

Figure 1:
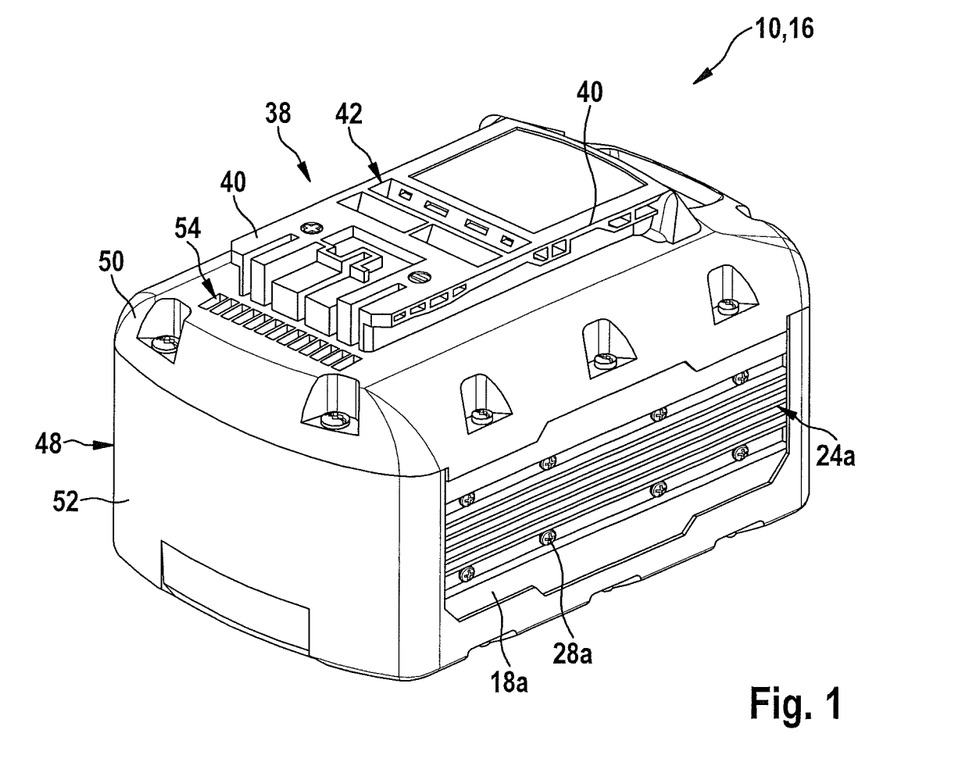
FIG. 1 shows a perspective representation of a rechargeable battery according to the present invention, having a rechargeable battery housing which has heat dissipation elements.

FIG. 1 shows a rechargeable battery 10, which is configured as a rechargeable tool battery. Rechargeable battery 10 has a cell block 12, a rechargeable battery housing 16, a sealing device 20, a coupling device 24a and a tool interface 38.

Figure 2:
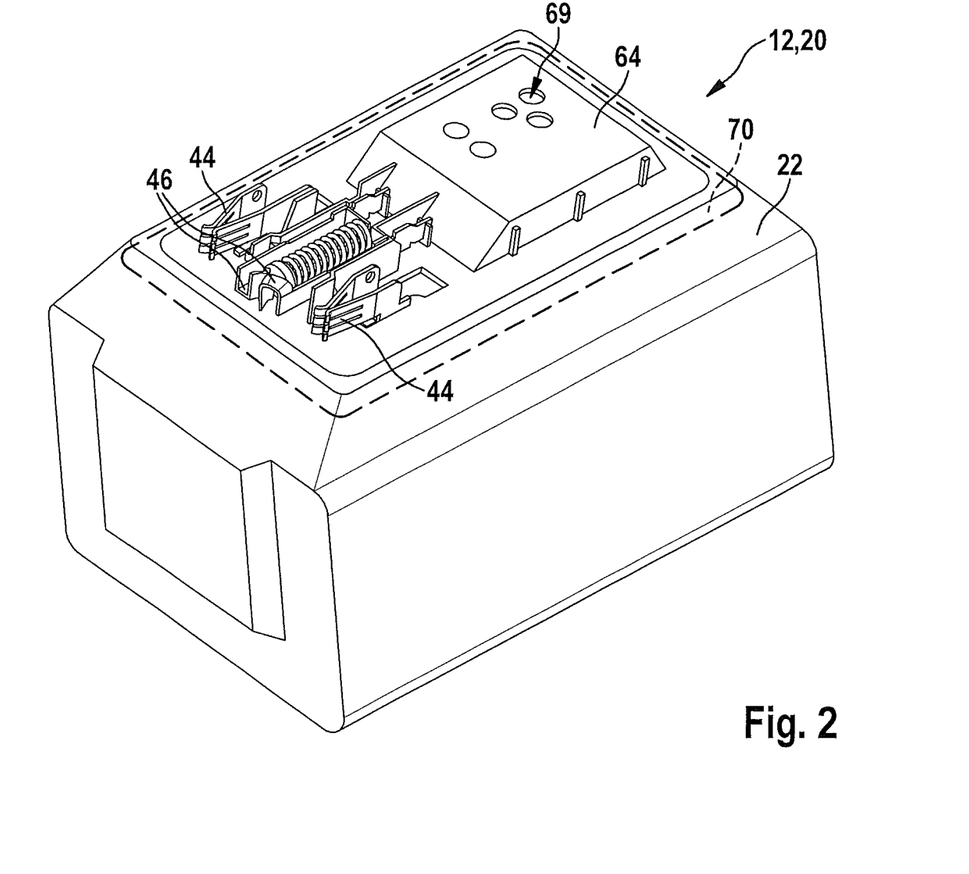
FIG. 2 shows a perspective representation of a sealing device and of a cell block of the rechargeable battery in FIG. 1.
Figure 3:
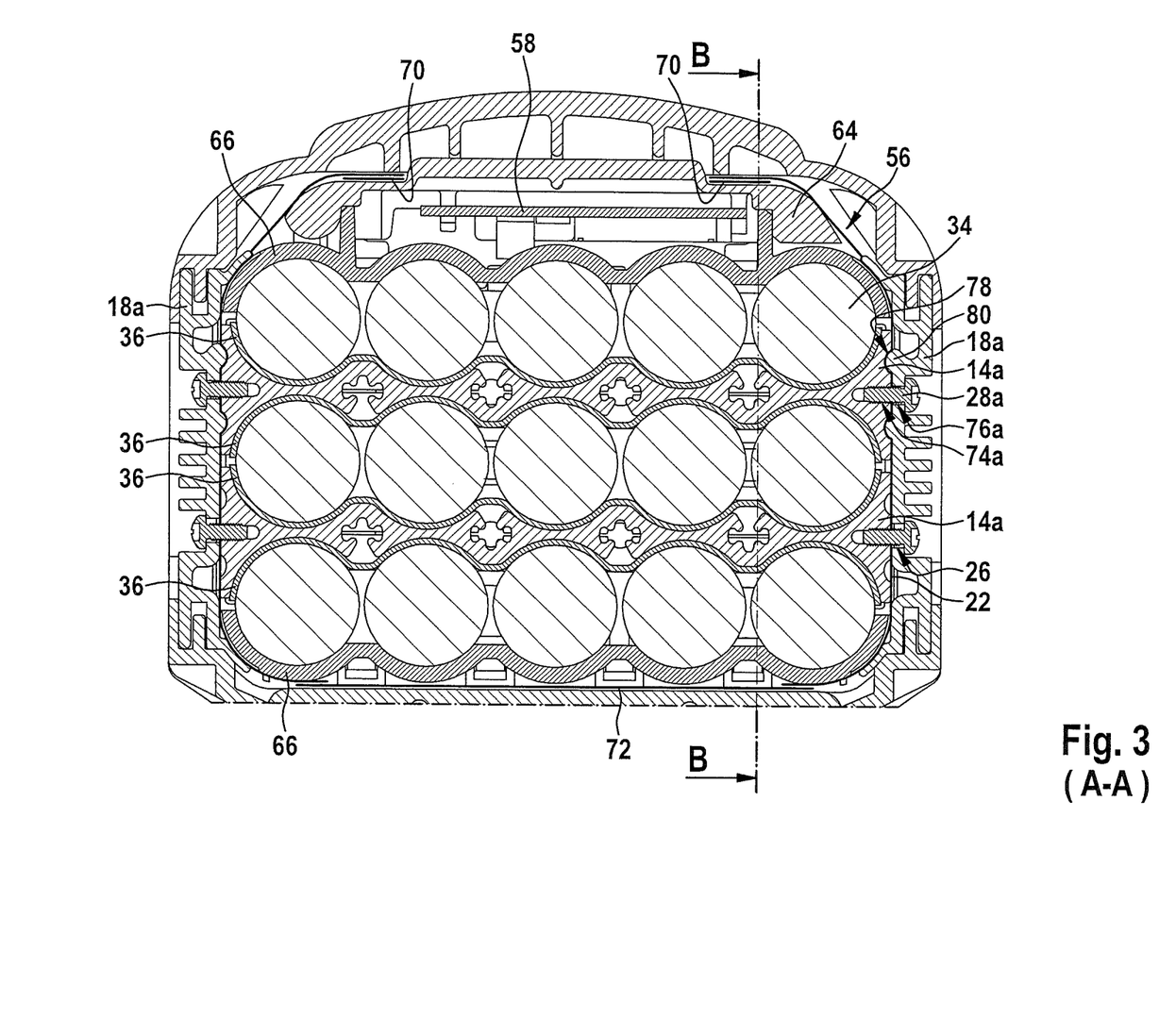
FIG. 3 shows a first section A-A of the rechargeable battery of FIG. 1, which shows heat dissipation elements of the cell block.
Figure 4:
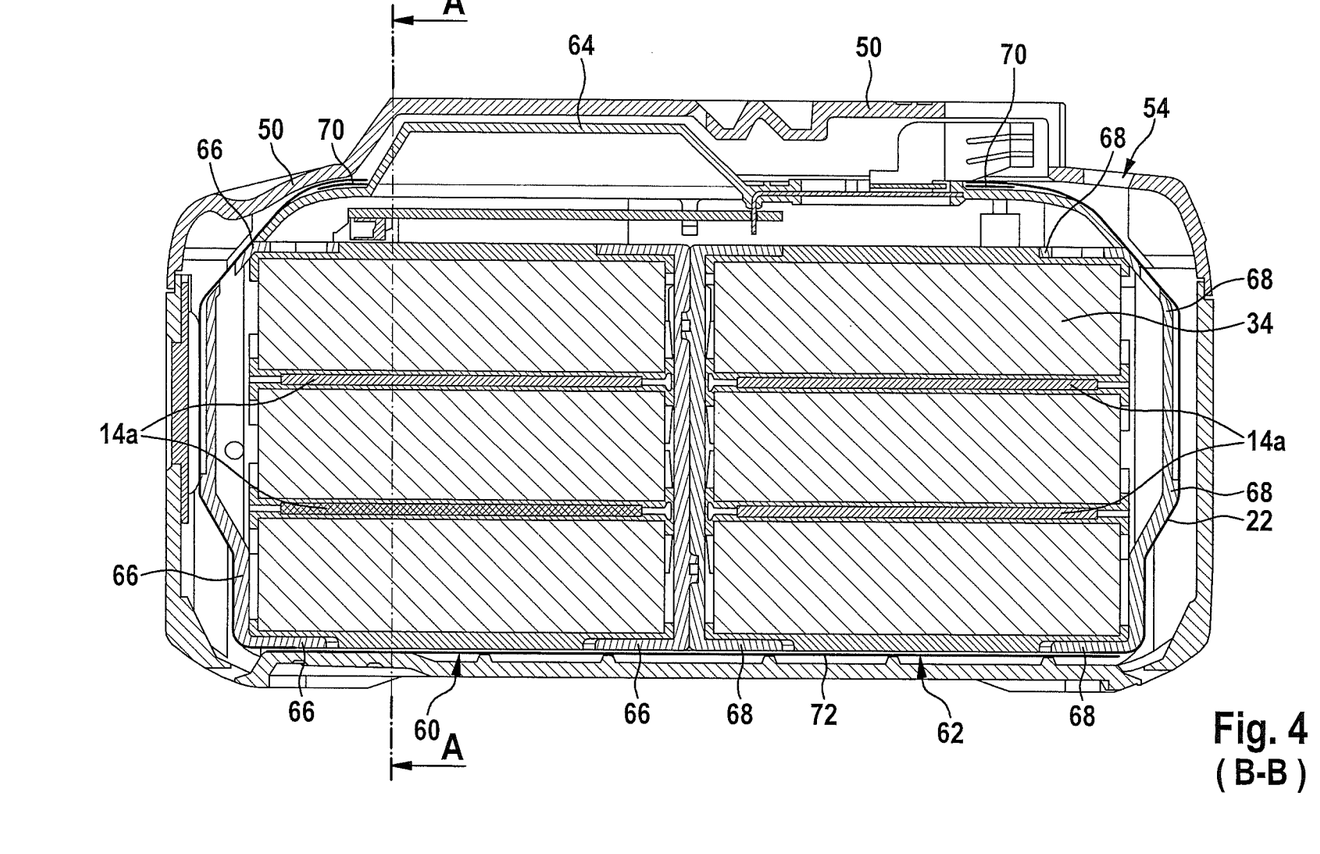
FIG. 4 shows a second section B-B perpendicular to the first section of the rechargeable battery of FIG. 3.
Figure 5:
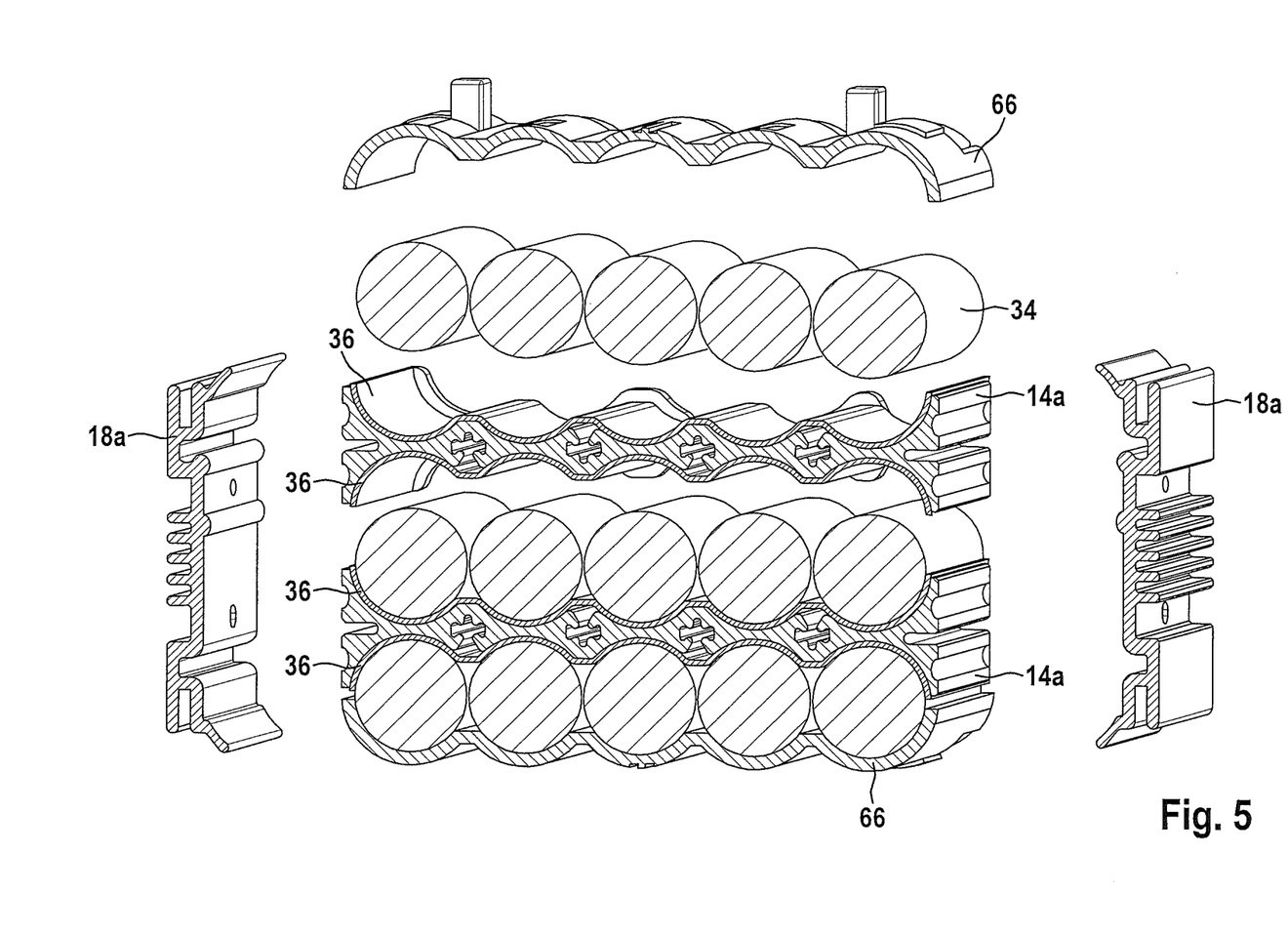
FIG. 5 shows a perspectively shown disk section of a part of the rechargeable battery of FIG. 1 in an exploded representation.
Figure 6:
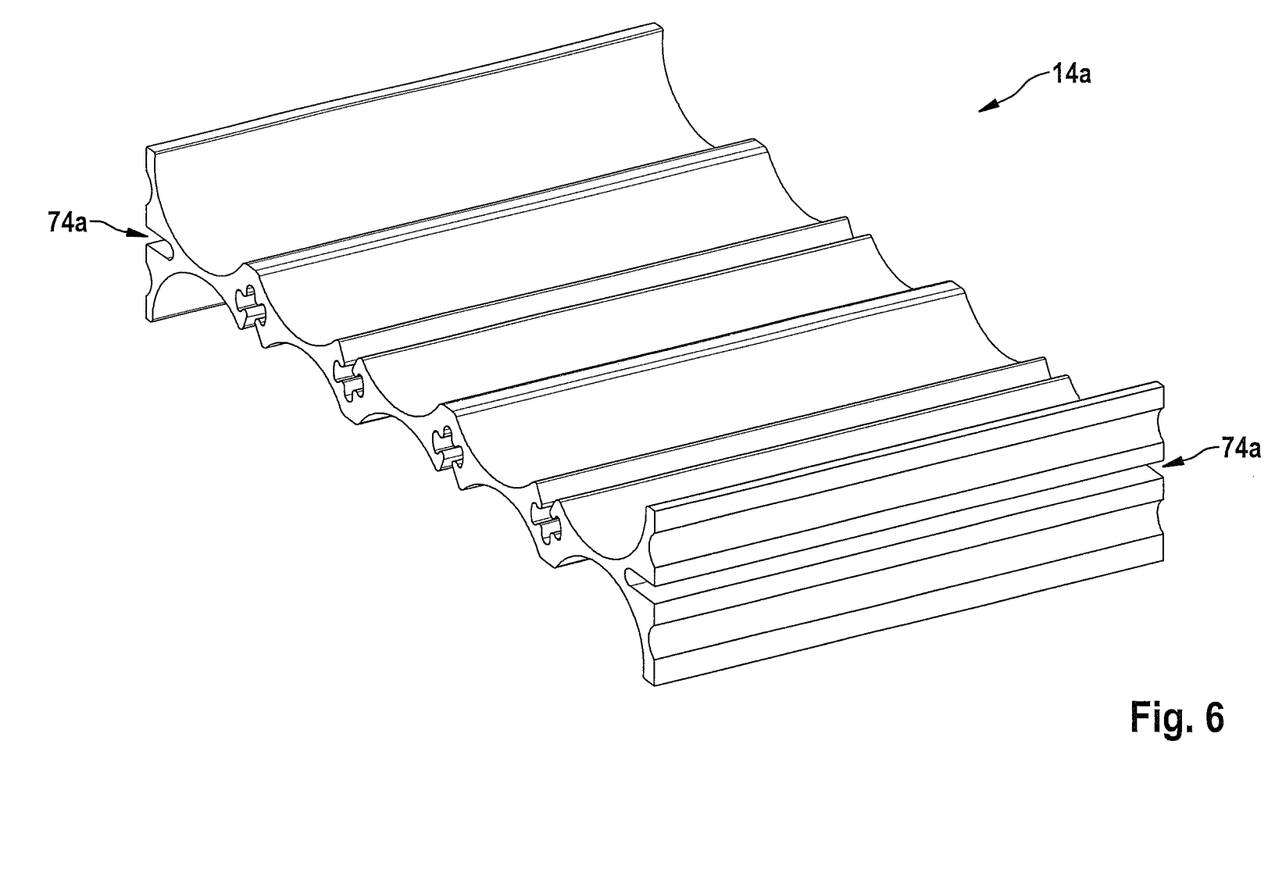
FIG. 6 shows a perspective representation of one of the heat dissipation elements of the rechargeable battery of FIG. 1.

Tool interface 38 is provided to produce a mechanical and an electrical connection with a tool. For the mechanical connection, tool interface 38 has guide rails 40 and snap-in arrangement 42. These elements are formed by rechargeable battery housing 16. As shown in FIG. 2, tool interface 38 has power contacts 44 for the electrical connection and has communication contacts 46. These contacts 44, 46 are situated on cell block 12.

Rechargeable battery housing 16 has a base element 48 and a cover element 50. Tool interface 38 is situated on cover element 50. Cover element 50 forms an upper side of rechargeable battery 10. Cover element 50 is configured as a plastic part. Cover element 50 has an air flow opening 54, through which a charging unit is able to blow an air current into rechargeable battery housing 16. Through this air flow opening 54 and through additional gaps in rechargeable battery housing 16, dust and/or moisture are able to penetrate into rechargeable battery housing 16.

Base element 48 has a floor element 52 and two heat radiation elements 18a, of which only one is shown in FIG. 1. Floor element 52 borders on rechargeable battery 10 on a lower side, on a front side and on a rear side, each mentioned with reference to a coupling direction of tool interface 38. In addition, floor element 52 forms four corners bordering on the lower side. Floor element 52 is configured as a plastic part.

The two heat radiation elements 18a in each case border on rechargeable battery 10 on one side. Heat radiation elements 18a are implemented as aluminum bodies. Heat radiation elements 18a have cooling ribs on an outer side. Heat radiation elements 18a, base element 48 and cover element 50 are screwed together with one another. Together, heat radiation elements 18a, base element 48 and cover element 50 enclose cell block 12 entirely. Alternatively or in addition, a rechargeable battery could have heat radiation elements, for example, at the front side, at the rear side and/or at the lower side.

As shown in FIGS. 2 through 6, cell block 12 has four heat dissipation elements 14a, thirty rechargeable battery cells 34, eight fastening arrangements 36, one cell block housing 56 and one electronics system 58. Electronics system 58 is provided to monitor battery voltages and temperatures of rechargeable battery cells 34, and to avoid damage to rechargeable battery cells 34. Cell block housing 56 is provided to connect heat dissipation elements 14a, rechargeable battery cells 34, fastening arrangement 36 and electronics system 58 to form an assembly, which forms cell block 12.

Cell block housing 56 has a first cell block subhousing 60, a second cell block subhousing 62 and an electronics system housing part 64. Each of cell block subhousing 60, 62 combines two of heat dissipation elements 14a, fifteen of rechargeable battery cells 34 and four of fastening arrangement 36 to form a subassembly of the assembly forming cell block 12. Each of cell block subhousing 60, 62 is composed of a plurality of housing arrangements 66, 68 that appears useful to one skilled in the art.

Electronics system housing part 64 borders on an inner space in which electronics system 58 is situated. The contacts of tool interface 38, in this case power contacts 44 and communication contacts 46, are partially cast into electronics system housing part 64. Electronics system housing part 64 has air conditioning openings 69, which are closed using a waterproof, breathable membrane, not shown here in greater detail.

Sealing device 20 is provided to seal a space of cell block 12 generated by cell block housing 56. Sealing device 20 has a sealing foil 22, first sealing arrangement 70 and second sealing arrangement 72. Sealing foil 22 is configured hose-shaped. Alternatively, the sealing foil could be configured to be sack-shaped. Sealing foil 22 is configured to be self-shrinking. Sealing foil 22 lies adjacent to cell block 12 on the front side, the rear side and the two lateral sides. Sealing foil 22 lies in a planar manner adjacent to heat dissipation elements 14a of cell block 12.

First sealing arrangement 70 is configured as a jointing compound. First sealing arrangement 70 is configured as a butyl sealant, in this case. First sealing arrangement 70 is provided to seal a gap between cell block housing 56 and sealing foil 22. In this case, first sealing arrangement 70 seals a gap between electronics system housing part 64 and sealing foil 22. Consequently, first sealing arrangement 70 prevents the penetration of dust and/or moisture into cell block 12.

Second sealing arrangement 72 seals the lower side of sealing foil 22 facing away from tool interface 38. Second sealing arrangement 72 is configured as a self-adhering foil. Second sealing arrangement 72 closes an opening of hose-shaped sealing foil 22 facing away from tool interface 38. Sealing device 20 thus encloses cell block 12 on five sides. Electronics system housing part 64 of cell block housing 56 seals the sixth side.

Heat dissipation elements 14a extend along a straight line through the entire cell block 12. Rechargeable battery cells 34 are situated on two sides facing away from each other of heat dissipation elements 14a. Heat dissipation elements 14a border on partially cylindrical recesses, which are provided to accommodate rechargeable battery cells 34 at least partially. Between heat dissipation elements 14a and rechargeable battery cells 34, fastening arrangement 36 is situated in each case. Fastening arrangement 36 prevents direct contact between heat dissipation elements 14a and rechargeable battery cells 34. Fastening arrangement 36 is configured as electrically insulating and at least partially elastic layer elements.

Heat dissipation elements 14a and heat radiation elements 18a are formed as components configured separately from each other. Coupling device 24a is provided to press against each other one of heat dissipation elements 14a and one of heat radiation elements 18a respectively. Coupling device 24a presses respectively one of heat dissipation elements 14a and one of heat radiation elements 18a from two different sides against sealing foil 22. Thus, coupling device 24a exerts a compression force on sealing foil 22 of sealing device 20. Thereby heat dissipation elements 14a and heat radiation elements 18a lie adjacent to sealing foil 22 in a planar manner.

Fastening arrangement 36 conducts the heat created during charging and discharging in rechargeable battery cells 34 to heat dissipation elements 14a. Heat dissipation elements 14a conduct this heat out of cell block 12 to sealing foil 22. Sealing foil 22 conducts a substantial proportion of the heat to heat radiation elements 18a. Screws 28a of coupling device 24a conduct a further proportion of the heat to heat radiation elements 18a. Heat radiation elements 18a give off the heat by radiation and convection to the surroundings of rechargeable battery 10.

Coupling device 24a has screws 28a, grooves 74a bordered by heat dissipation elements 14a, threaded recesses 76a bordered by heat radiation element 18a, positioning arrangement 78 of heat dissipation elements 14a and positioning arrangement 80 of heat radiation elements 18a. During assembly, respectively one of heat dissipation elements 14a and one of heat radiation elements 18a are set onto one another using positioning arrangements 78, 80 as provided. Positioning arrangement 78 of heat dissipation elements 14a are configured as semicircular grooves. Positioning arrangement 80 of heat radiation elements 18a are configured as semicircular springs. Positioning arrangement 78 of heat dissipation elements 14a and positioning arrangement 80 of heat radiation elements 18a are configured corresponding to one another.

Subsequently, screws 28a are screwed into grooves 74a through sealing foil 22. In this context, recesses 26 form in sealing foil 22 of sealing device 20. Screws 28a punch holes into sealing foil 22. Sealing foil 22 seals a region about screws 28a, in the process. In addition, an additional sealing arrangement could be inserted in the region of recess 26. Screws 28a press towards each other one of heat dissipation elements 14a and one of heat radiation elements 18a, respectively.

FIGS. 7 through 10 show additional exemplary embodiments of the present invention. The following descriptions and the drawings are limited essentially to the differences between the exemplary embodiments, wherein regarding components that are designated in the same way, particularly regarding components having identical reference numerals, it is fundamentally possible to refer also to the drawings and/or the description of the other exemplary embodiments, especially of FIGS. 1 and 6. In order to distinguish the exemplary embodiments, the letter a has been added after the reference numerals of the exemplary embodiment in FIGS. 1 through 6. In the exemplary embodiments of FIGS. 7 through 10, the letter a was replaced by the letters b through e.

Figure 7:
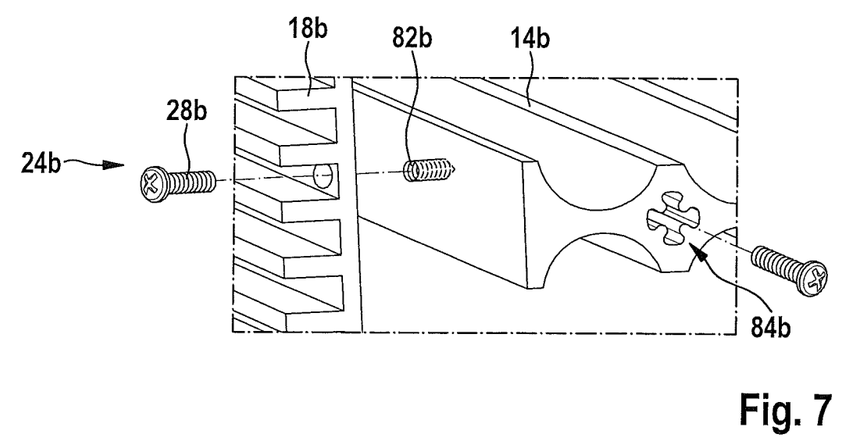
FIG. 7 shows an alternative exemplary embodiment of the heat dissipation elements of the rechargeable battery of FIG. 1.

FIG. 7 shows an heat dissipation elements 14b, an heat radiation element 18b and a coupling device 24b of a rechargeable battery 10, as is described apart from that in the exemplary embodiment of FIGS. 1 through 6. Instead of a groove, heat dissipation elements 14b has blind holes 82b, in which screws 28b of coupling device 24b of rechargeable battery 10 engage. In addition, heat radiation elements or other elements that appear useful to one skilled in the art could be screw fitted in a rifled channel 84b of heat dissipation elements 14b.

Figure 8:
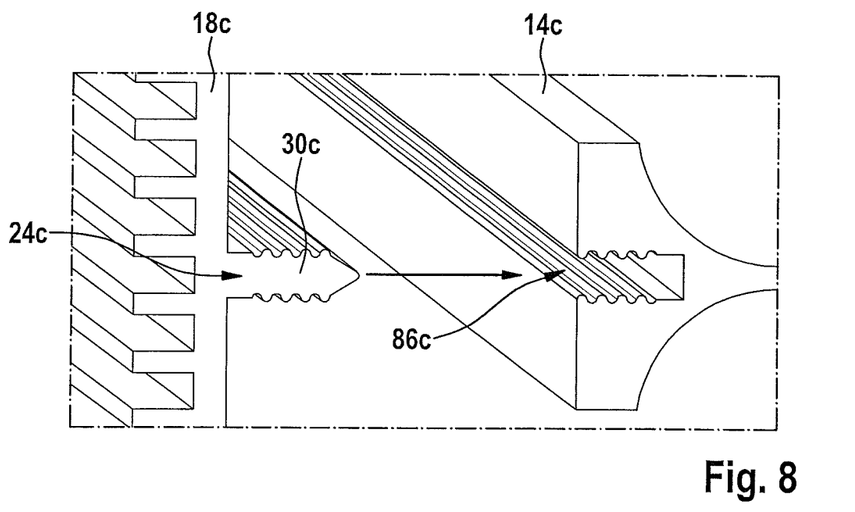
FIG. 8 shows a further alternative exemplary embodiment of the heat dissipation elements and the heat radiation elements of the rechargeable battery of FIG. 1.

FIG. 8 shows an heat dissipation element 14c, an heat radiation element 18c and a coupling device 24c of a rechargeable battery 10, as is described apart from that in the exemplary embodiment of FIGS. 1 through 6. Coupling device 24c has a snap-in arrangement 30c formed by heat radiation element 18c. Snap-in arrangement 30c is shaped like a fir tree. Heat dissipation elements 14c forms a snap-in recess 86c of coupling device 24c. Snap-in recess 86c has undercuts into which the branches of fir tree-shaped snap-in arrangement 30c snap in. A sealing foil of rechargeable battery 10, that is not shown in greater detail, is pressed during the snapping in of coupling device 24c into the snap-in recess 86c and clamped in between heat dissipation element 14c and heat radiation element 18c, before it forms a recess by which snap-in arrangement 30c penetrates through the sealing foil. The sealing foil thus seals between heat dissipation element 14c and heat radiation element 18c.

Figure 9:
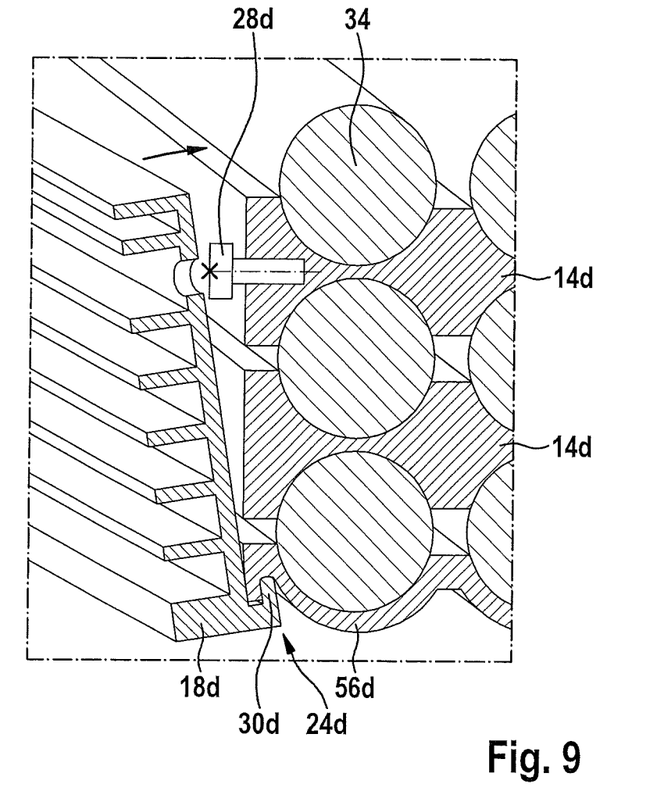
FIG. 9 shows a next alternative exemplary embodiment of the heat dissipation elements and the heat radiation elements of FIG. 1.

FIG. 9 shows two heat dissipation elements 14d, an heat radiation element 18d, a coupling device 24d, a cell block housing 56d and rechargeable battery cells 34 of a rechargeable battery 10, as is described apart from that in the exemplary embodiment of FIGS. 1 through 6. Coupling device 24d has snap-in arrangement 30d formed by heat radiation element 18d and screws 28d. Snap-in arrangement 30d engages with an undercut of cell block housing 56d of rechargeable battery 10. Alternatively, snap-in arrangement could engage in an undercut of a heat dissipation element. Screws 28d press heat dissipation element 14d and heat radiation element 18d against each other and fix snap-in arrangement 30d in the undercut.

Figure 10:
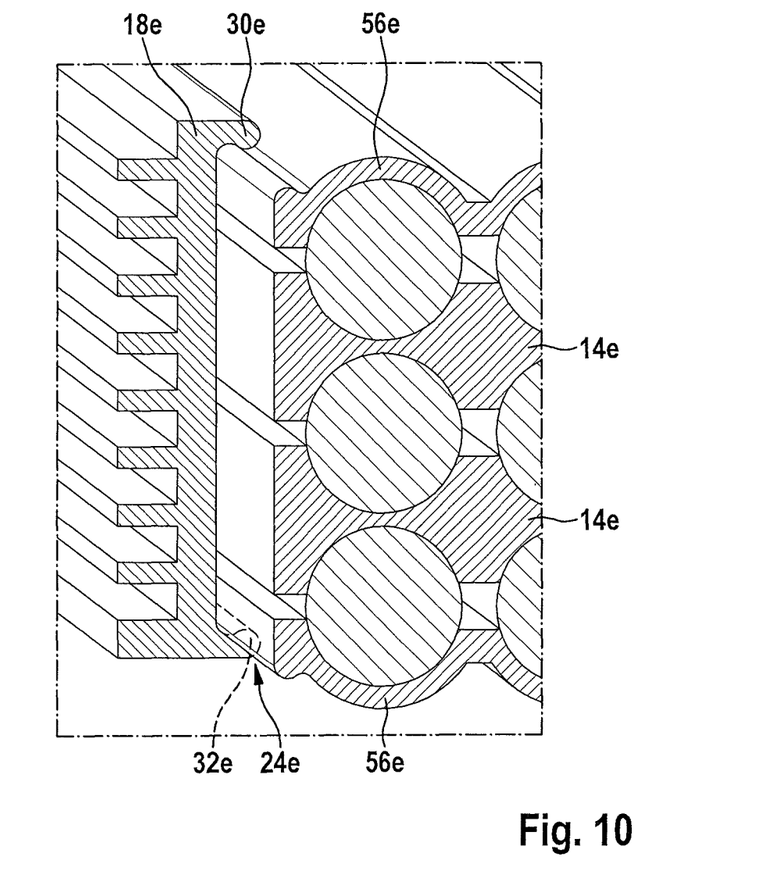
FIG. 10 shows one more alternative exemplary embodiment of the heat dissipation elements and the heat radiation elements of the rechargeable battery of FIG. 1.

FIG. 10 shows two heat dissipation elements 14e, an heat radiation element 18e, a coupling device 24e and a cell block housing 56e of a rechargeable battery 10, as is described apart from that in the exemplary embodiment of FIGS. 1 through 6. Coupling device 24e has two snap-in arrangement 30e, 32e that are aligned in opposite directions, formed by heat radiation element 18e. Snap-in arrangement 30e, 32e engage in undercuts in cell block housing 56e of rechargeable battery 10. Alternatively, snap-in arrangement could engage in an undercut of a heat dissipation element. Snap-in arrangements 30e, 32e, through a sealing foil not shown in greater detail, press on cell block housing 56e, in this instance. The sealing foil has no recess through which coupling device 24e operates.

What is claimed is:

1. A rechargeable battery, comprising:
   at least one cell block, which has at least one heat dissipation element, which is provided to dissipate heat from the cell block;
   a rechargeable battery housing, which has at least one heat radiation element, which is provided at least to radiate the heat dissipated by the heat dissipation element to the surroundings; and
   a sealing device configured to completely enclose the cell block in a dustproof manner and a waterproof manner,
   wherein the heat dissipation element and the heat radiation element are formed as components configured separately from each other,
   wherein the heat dissipation element and the heat radiation element are connected to each other in a form-locking and a force-locking manner,
   wherein the sealing device is situated at least partially between the heat dissipation element and the heat radiation element to conduct an at least substantial proportion of the heat from the heat dissipation element to the heat radiation element,
   wherein the sealing device has a sealing foil enclosing the cell block,
   wherein the sealing foil is configured to rest against the heat dissipation element and the heat radiation element in a planar manner.

2. The rechargeable battery of claim 1, further comprising:
   a coupling device to press the heat dissipation element and the heat radiation element against each other.

3. The rechargeable battery of claim 1, wherein the coupling device effects a compression force on the sealing device.

4. The rechargeable battery of claim 2, wherein the sealing device has at least one recess, through which the coupling device acts.

5. The rechargeable battery of claim 2, wherein the coupling device has at least one screw, which presses the heat dissipation element and the heat radiation element against each other.

6. The rechargeable battery of claim 2, wherein the coupling device has at least one snap-in arrangement, which presses the heat dissipation elements and the heat radiation element against each other.

7. The rechargeable battery of claim 1, wherein the cell block has at least one rechargeable battery cell and at least one fastening arrangement to fasten the at least one rechargeable battery cell at least in the heat dissipation element.

8. The rechargeable battery of claim 1, wherein the rechargeable battery includes a rechargeable tool battery.

9. The rechargeable battery of claim 2, wherein the coupling device effects a compression force on the sealing device.

10. The rechargeable battery of claim 2, wherein the sealing device has at least one recess, through which the coupling device acts.

11. The rechargeable battery of claim 1, wherein the heat dissipation element is not in direct contact with the heat radiation element.

12. The rechargeable battery of claim 1, wherein the sealing foil is thinner than 1000 μm.

13. The rechargeable battery of claim 1, wherein the sealing foil is a self-shrinking foil.

14. The rechargeable battery of claim 1, wherein the sealing foil is hose-shaped or sack-shaped.

15. The rechargeable battery of claim 14, wherein the hose-shaped or sack-shaped sealing foil has an opening which is closed by a sealing arrangement configured as a self-adhering foil.

16. The rechargeable battery of claim 1, wherein the sealing foil is configured to rest against the heat dissipation element in a planar manner.

17. The rechargeable battery of claim 1, wherein the heat dissipation element rests against a first side of the sealing foil and the heat radiation element rests against a second side of the sealing foil such that the sealing foil is disposed at least partially directly between the heat dissipation element and the heat radiation element.

18. The rechargeable battery of claim 1, wherein the heat dissipation element and the heat radiation element are separated from each other by the sealing foil such that the heat dissipation element and the heat radiation element are not in direct contact with each other.

19. The rechargeable battery of claim 1, further comprising a coupling device to press the heat dissipation element and the heat radiation element from two different sides against the sealing foil.

20. The rechargeable battery of claim 19, wherein the coupling device has at least one screw which presses the heat dissipation element and the heat radiation element against each other and which penetrates through the sealing foil.

21. A rechargeable battery, comprising:
at least one cell block, which has at least one heat dissipation element, which is provided to dissipate heat from the cell block;
a rechargeable battery housing, which has at least one heat radiation element, which is provided at least to radiate the heat dissipated by the heat dissipation element to the surroundings; and
a sealing device configured to completely enclose the cell block in a dustproof manner and a waterproof manner, wherein the sealing device has a sealing foil,
wherein the heat dissipation element and the heat radiation element are formed as components configured separately from each other,
wherein the sealing device is situated at least partially between the heat dissipation element and the heat radiation element,
wherein the sealing device is provided to conduct an at least substantial proportion of the heat from the heat dissipation element to the heat radiation element,
wherein the sealing foil is configured to rest against the heat dissipation element and the heat radiation element in a planar manner.

22. The rechargeable battery of claim 21, further comprising: a coupling device to press the heat dissipation element and the heat radiation element against each other.

23. The rechargeable battery of claim 21, wherein the coupling device effects a compression force on the sealing device.

24. The rechargeable battery of claim 21, wherein the sealing device has at least one recess, through which the coupling device acts.

25. The rechargeable battery of claim 22, wherein the coupling device has at least one screw, which presses the heat dissipation element and the heat radiation element against each other.

26. The rechargeable battery of claim 22, wherein the coupling device has at least one snap-in arrangement, which presses the heat dissipation elements and the heat radiation element against each other.

27. The rechargeable battery of claim 21, wherein the cell block has at least one rechargeable battery cell and at least one fastening arrangement to fasten the at least one rechargeable battery cell at least in the heat dissipation element.

28. The rechargeable battery of claim 21, wherein the rechargeable battery includes a rechargeable tool battery.

29. The rechargeable battery of claim 22, wherein the coupling device effects a compression force on the sealing device.

30. The rechargeable battery of claim 22, wherein the sealing device has at least one recess, through which the coupling device acts.

31. The rechargeable battery of claim 21, wherein the heat dissipation element is not in direct contact with the heat radiation element.

32. The rechargeable battery of claim 21, wherein the sealing foil is thinner than 1000 μm.

33. The rechargeable battery of claim 21, wherein the sealing foil is a self-shrinking foil.

34. The rechargeable battery of claim 21, wherein the sealing foil is hose-shaped or sack-shaped.

35. The rechargeable battery of claim 34, wherein the hose-shaped or sack-shaped sealing foil has an opening which is closed by a sealing arrangement configured as a self-adhering foil.

36. The rechargeable battery of claim 21, wherein the sealing foil is configured to rest against the heat dissipation element in a planar manner.

37. The rechargeable battery of claim 21, wherein the heat dissipation element rests against a first side of the sealing foil and the heat radiation element rests against a second side of the sealing foil such that the sealing foil is disposed at least partially directly between the heat dissipation element and the heat radiation element.

38. The rechargeable battery of claim 21, wherein the heat dissipation element and the heat radiation element are separated from each other by the sealing foil such that the heat dissipation element and the heat radiation element are not in direct contact with each other.

39. The rechargeable battery of claim 21, further comprising a coupling device to press the heat dissipation element and the heat radiation element from two different sides against the sealing foil.

40. The rechargeable battery of claim 39, wherein the coupling device has at least one screw which presses the heat dissipation element and the heat radiation element against each other and which penetrates through the sealing foil.

* * * * *